United States Patent

King

Patent Number: 5,622,008
Date of Patent: Apr. 22, 1997

[54] WEATHERSTRIP WITH UNCURED FOOT

[75] Inventor: S. Brian King, Noblesville, Ind.

[73] Assignee: GenCorp Inc., Fairlawn, Ohio

[21] Appl. No.: 371,946

[22] Filed: Jan. 12, 1995

[51] Int. Cl.[6] .................................................. E06B 7/22
[52] U.S. Cl. ........................................ 49/498.1; 49/490.1
[58] Field of Search ........................... 49/490.1, 498.1, 49/475.1, 479.1; 428/122, 358

[56] References Cited

U.S. PATENT DOCUMENTS

| | | | |
|---|---|---|---|
| 1,877,729 | 9/1932 | Chaffee | 20/69 |
| 1,928,259 | 9/1933 | McCabe | 288/1 |
| 2,053,140 | 9/1936 | Groves | 288/1 |
| 2,114,771 | 4/1938 | Turner et al. | 285/123 |
| 2,357,513 | 9/1944 | Harmon | 20/69 |
| 2,538,406 | 1/1951 | Allen | 18/53 |
| 3,099,110 | 7/1963 | Spaight | 50/346 |
| 3,288,667 | 11/1966 | Martin | 161/44 |
| 3,357,137 | 12/1967 | Lombardi | 49/475 |
| 3,378,958 | 4/1968 | Parks et al. | 49/489 |
| 3,535,824 | 10/1970 | Kessler | 49/488 |
| 3,706,628 | 12/1972 | Azzola | 161/159 |
| 3,883,993 | 5/1975 | Pullan | 49/490 |
| 4,233,780 | 11/1980 | Royce et al. | 49/475.1 |
| 4,381,273 | 4/1983 | Azzola | 264/45.9 |
| 4,419,844 | 12/1983 | Kreisfeld | 49/475 |
| 4,447,065 | 5/1984 | Dupuy et al. | 49/490.1 X |
| 4,513,044 | 4/1985 | Shigeki et al. | 49/490.1 X |
| 4,708,351 | 11/1987 | Midooka et al. | 49/490.1 X |
| 4,749,201 | 6/1988 | Hunger | 277/165 |
| 4,775,570 | 10/1988 | Ohienforst et al. | 49/490.1 X |
| 4,848,035 | 7/1989 | Sakuma et al. | 49/490.1 |
| 5,010,689 | 4/1991 | Vaughan | 49/490.1 X |
| 5,072,546 | 12/1991 | Ogawa | 49/490.1 |
| 5,411,785 | 5/1995 | Cook | 49/490.1 X |
| 5,437,124 | 8/1995 | Ahlfeld et al. | 49/490.1 X |
| 5,469,667 | 11/1995 | LeMarrec | 49/490.1 X |

Primary Examiner—Brian K. Green
Assistant Examiner—Jerry Redman
Attorney, Agent, or Firm—Robert F. Rywalski; Larry R. Meenan

[57] ABSTRACT

An extruded weatherstrip of an elastomeric material formed by the polymerization of ethylene propylene and diene monomers capable of adapting to the surface contour of a retention flange. The weatherstrip includes a foot of pliable uncured elastomeric material and a seal member of cured elastomeric material formed integral with said uncured foot. The seal member has a retention member which forces the foot within imperfections and variations in the retention flange to provide a weather resistant seal with the retention flange.

14 Claims, 2 Drawing Sheets

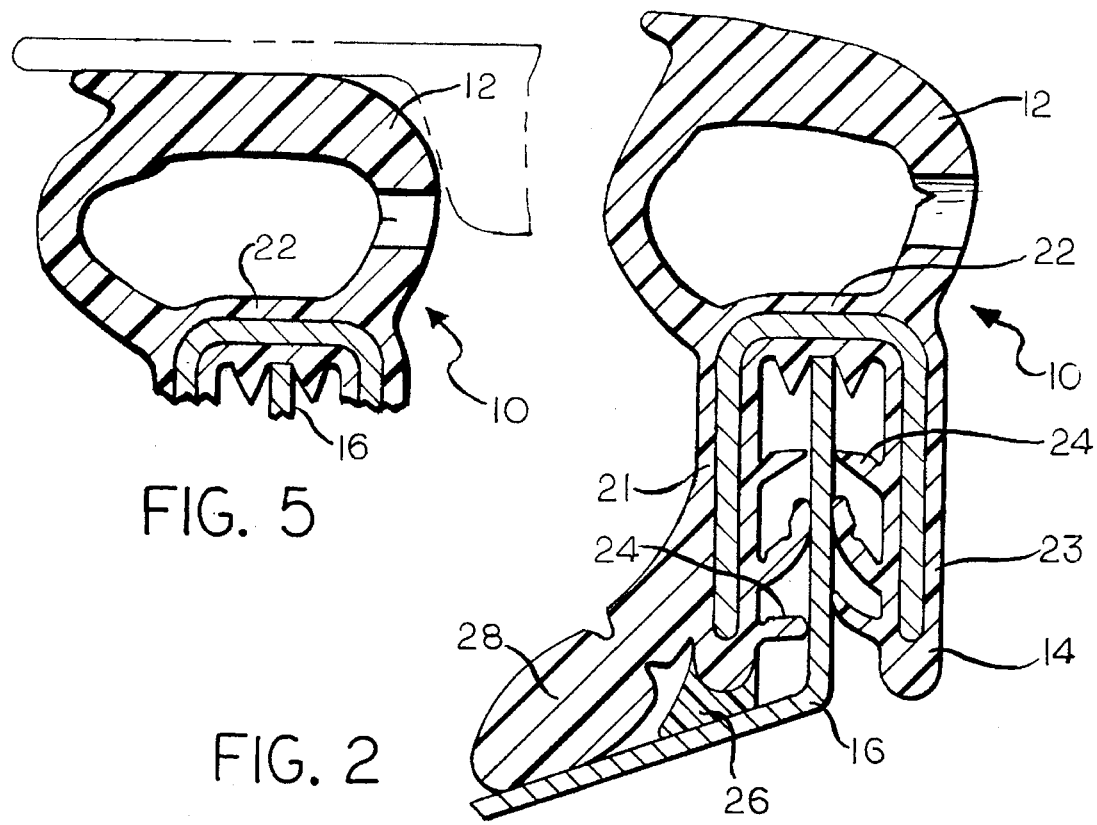
FIG. 5
FIG. 2
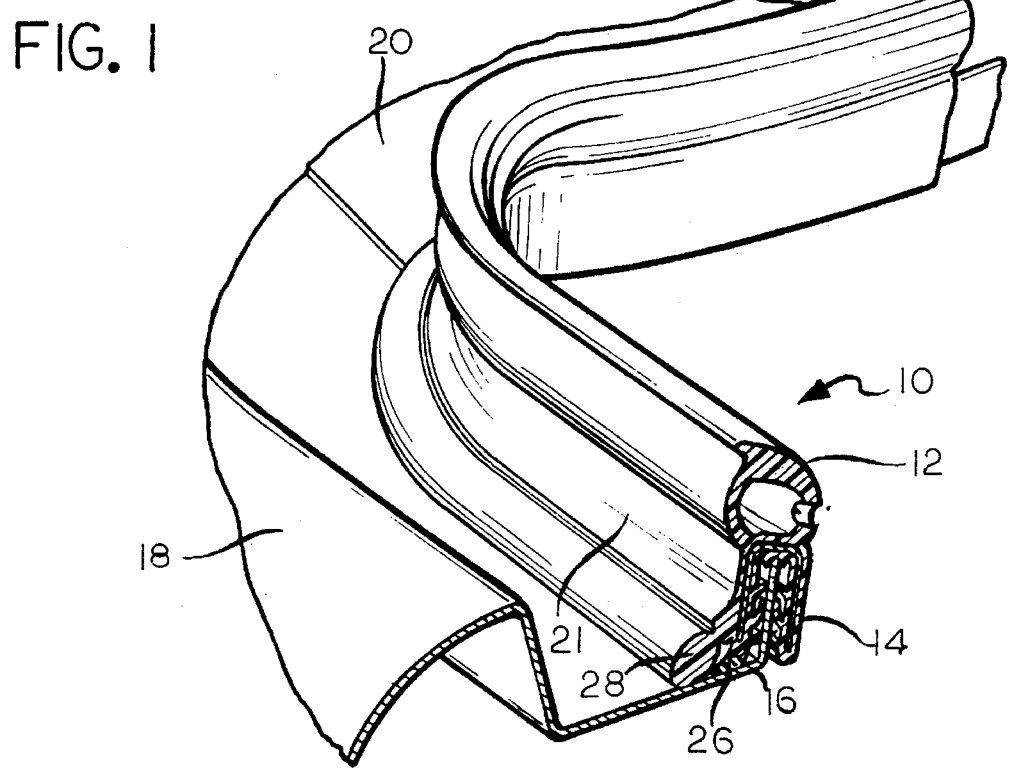
FIG. 1

WEATHERSTRIP WITH UNCURED FOOT

FIELD OF THE INVENTION

The present invention relates to an extruded weatherstrip having an uncured foot capable of adapting to the surface contour of a retention flange and process of making the weatherstrip. More particularly, the present invention relates to an extruded weatherstrip having a foot of uncured elastomeric material formed by the polymerization of ethylene propylene and diene monomers and a seal member of cured elastomeric material formed by the polymerization of ethylene propylene and diene monomers.

BACKGROUND OF THE INVENTION

The primary function of a weatherstrip is to stop moisture from entering a specific area on a vehicle. The design of a weatherstrip is initially based upon a nominal sheet metal condition at the location that the weatherstrip is to be installed. The weatherstrip is then examined to determine if the weatherstrip can tolerate sheet metal variations which include retention flange height, seal gaps, retention flange thickness, set-offs and the like. Once the design of the weatherstrip is modified to accept the numerous design requirements the weatherstrip design is placed in commercial production.

However, quite often, the stated sheet metal variations are less than actual commercial production variations which the weatherstrip was initially designed to accommodate. Because of these unanticipated or extra variations, last minute design changes to the weatherstrip are quite often necessary to adapt to the excessive build variation on vehicles. It is because of these last minute variations in weatherstrip design that manufacturing costs increase and take longer to implement which leads to customer dissatisfaction. In addition, these weatherstrip design changes also cause the vehicle manufacturer to ultimately employ less than ideal practices in an attempt to stop leaks from occurring. The most common of these is to put a substance known as "mastic" into the carrier portion of the weatherstrip. Mastic is a mineral oil and clay mixture that is used to fill in and seal any gaps between the retention flange and the weatherstrip carrier where water might leak through. This is not an ideal solution to the problem since it adds cost to the part, creates another variable for the manufacturer to deal with and most importantly is not always affective in stopping the leak.

It will be appreciated from the foregoing that there is a significant need for a weatherstrip design that overcomes the problems of the prior art. One aspect of the present invention is to provide a weatherstrip design that can tolerate sheet metal variations including retention flange height, seal gaps, retention flange thickness, set-offs and the like. Another aspect of the present invention is to provide a weatherstrip design that once placed in commercial production is capable of adapting to many of the excessive build variations encountered on vehicles during commercial production

SUMMARY OF THE INVENTION

Briefly, according to this invention there is provided an extruded weatherstrip of an elastomeric material formed by the polymerization of ethylene propylene and diene monomers capable of adapting to the surface contour of a retention flange. The weatherstrip includes a foot of pliable uncured elastomeric material and a seal member of cured elastomeric material formed integral with the uncured foot. The seal member has a retention means to force the foot within imperfections and variations in the retention flange to provide a weather resistant seal with the retention flange.

The seal member includes a bulb and a depending carrier formed integral with the bulb. The bulb acts to seal against a movable surface which closes downward on the generally vertically extending retention flange. The depending carrier is generally of an inverted U-shape including a first leg and a second leg spaced apart and interconnected by a base attached to the bulb. In a preferred embodiment, the uncured foot extends from the first leg of the depending carrier.

In one embodiment, the first leg and the second leg include a plurality of grip fins. The grip fins extend inwardly from each leg of the depending carrier to grip the retention flange and retain the weather strip on the retention flange to force the uncured foot within imperfections and variations in the surface contour of the retention flange to provide a weather resistant seal with the retention flange. The weatherstrip may further include a cosmetic lip extending from a side of the first leg of the depending carrier to cover a portion of the retention flange.

In another embodiment, the first leg includes a retention aid extending inwardly from the first leg of the depending carrier to adhesively engage an outwardly facing surface of the retention flange. In addition, the second leg of the depending carrier includes a lower grip fin which frictionally engages and grips a lower inwardly facing surface of the retention flange such that the retention aid and the lower grip fin cooperatively retain the weather strip on the retention flange and force the uncured foot within imperfections and variations in the surface contour of the retention flange to provide a weather resistant seal with the retention flange.

The weatherstrip, including a foot of pliable uncured elastomeric material and a seal member of cured elastomeric material formed integral with the uncured foot, may be manufactured by the steps of extruding a continuous length of elastomeric material formed by the polymerization of ethylene propylene and diene monomers from one or more extruders through an appropriately configured die; selectively curing only the seal member of the weather strip; and cutting the continuous length of weatherstrip to a desired length before or after curing. The seal member may be selectively cured by adding a curing agent to only that portion of the elastomeric material forming the seal member.

BRIEF DESCRIPTION OF THE DRAWINGS

Further features and other objects and advantages of this invention will become clear from the following detailed description made with reference to the drawings in which:

FIG. 1 is a cross-sectional view of an extruded weatherstrip in accordance with the present invention;

FIG. 2 is a partial perspective view of the weatherstrip of FIG. 1 positioned adjacent the decklid of an automobile where the rear quarter panels and the passenger compartment rear shelf panel are spot welded together;

FIG. 5 is a partial perspective view of a weatherstrip in accordance with the present invention acting to seal against a movable surface.

DESCRIPTION OF THE PREFERRED EMBODIMENTS

Figure 4:
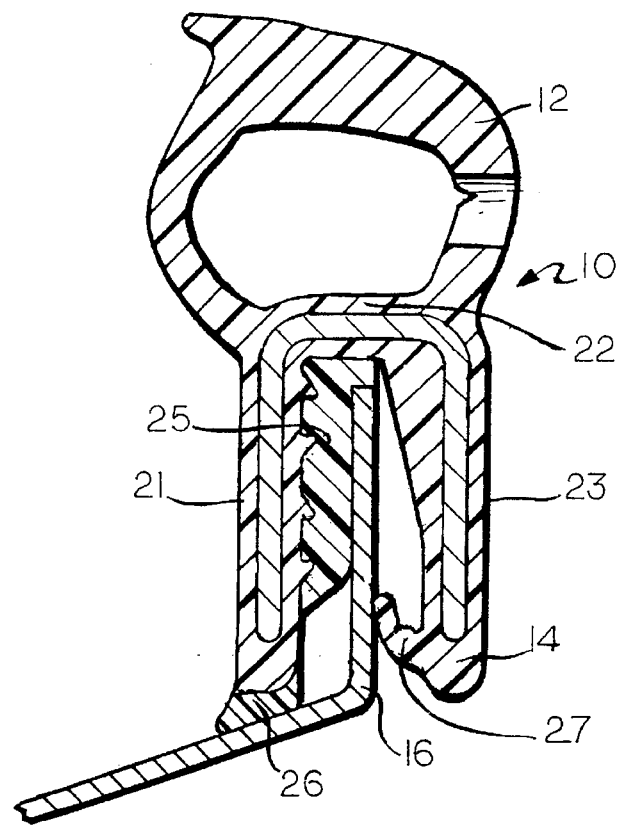
FIG. 4 is a partial perspective view of the weatherstrip of FIG. 3 positioned adjacent the decklid of an automobile where the rear quarter panels and the passenger compartment rear shelf panel are spot welded together.

Referring to the drawings wherein like reference characters represent like elements, an extruded weather strip 10 is illustrated. The invention was primarily developed in connection with a decklid weatherstrip and it is thus described herein. However, it will be readily apparent that the specific weatherstrip design and configuration may be varied and the invention used with equal facility for sealing imperfections and variations in a variety of surface contours such that the description of the same in relation to a decklid weatherstrip is not to be construed as a limitation on the scope of the invention.

Referring now to the drawings, FIGS. 1–4 illustrate an extruded weather strip 10 for sealing a decklid of a type well known in the art of an automobile (not shown). The weather strip 10 includes a foot 26 and a seal member of a bulb 12 and a depending carrier 14. The bulb 12 seals against the movable decklid surface which closes downward on a retention flange 16. The retention flange 16 is a generally vertically extending member formed by the juncture of the rear quarter panels 18 and the passenger compartment rear shelf panel 20.

The depending carrier 14 of the seal member of the weather strip 10 is formed integral with the bulb 12. The depending carrier 14 is generally of an inverted U-shape including spaced first and second legs 21 and 23 interconnected by a base 22. The base 22 of the depending carrier 14 is attached to the bulb 12.

As shown in FIGS. 1 and 2, extending inwardly from the first leg 21 and the second leg 23 of the U-shape depending carrier 14 are a plurality of grip fins 24 which grip the retention flange 16, retain the weather strip 10 on the retention flange and force an uncured foot 26 within imperfections in the sheet metal as more fully described herein. The grip fins 24 extend toward the retention flange 16 and frictionally engage both side surfaces of the retention flange thereby retaining the weatherstrip in position atop the retention flange. Extending from the side of the first leg 21 of the U-shaped depending carrier 14 is a cosmetic lip 28. The cosmetic lip 28 functions to cover a portion of the sheet metal from the edge of the retention flange 16 outward to present a more aesthetically appealing appearance.

Figure 3:
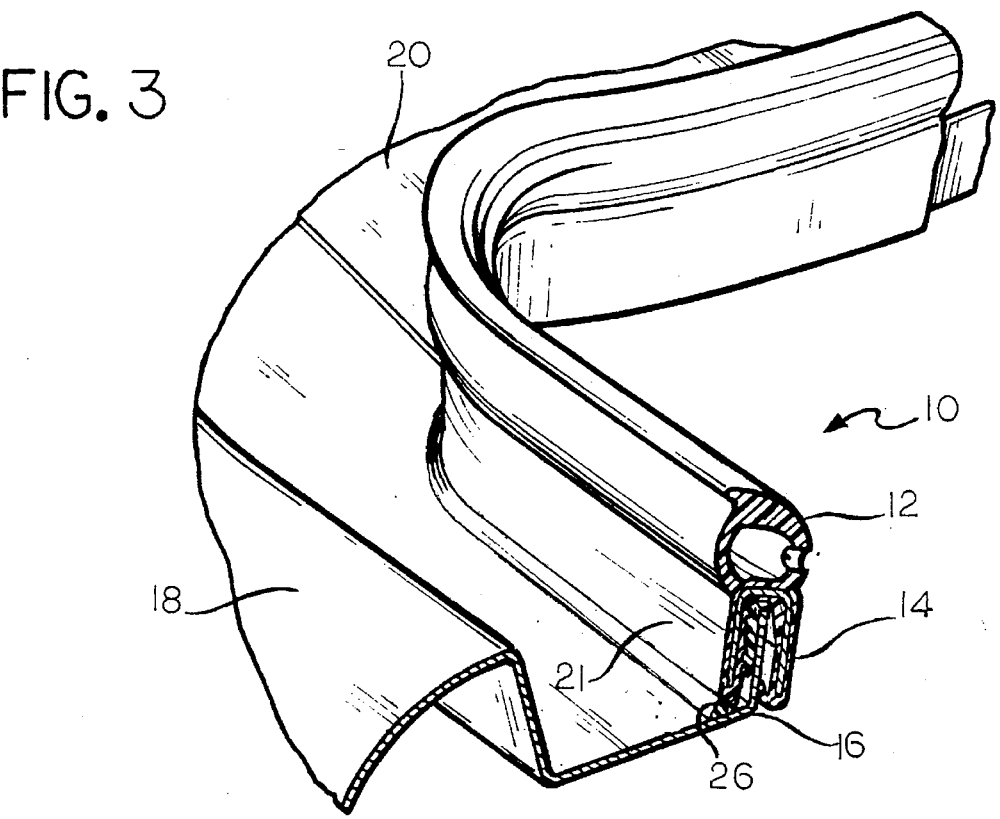
FIG. 3 is a cross-sectional view of another extruded weatherstrip in accordance with the present invention.

In yet another embodiment, as shown in FIGS. 3 and 4, extending inwardly from the side of the first leg 21 of the U-shape depending carrier 14 is a retention aid 25 which extends across and adhesively engages the outwardly facing surface of the retention flange 16. The retention aid 25 is a commercially available hot applied sealer material which performs the dual function of a mastic and an adhesive. For example, one suitable hot applied sealer material is sold under the product designation H5067-01 from Findley Adhesives Inc. of Wauwatosa, Wis. The sealer material, H5067-01, is a blend of mineral oil, oil extended hydrocarbon resin and synthetic rubber. Extending outwardly from the inwardly facing surface of the second leg 23 of the U-shape depending carrier 14 is a lower grip fin 27 which frictionally engages and grips the lower inwardly facing surface of the retention flange 16. The retention aid 25 and lower grip fin 27 cooperatively retain the weather strip 10 on the retention flange 16 and force an uncured foot 26 within imperfections in the sheet metal as more fully described herein.

It will be appreciated that one recurrent problem in automobile seals is where the rear quarter panels 18 and the passenger compartment rear shelf panel 20 are spot welded together. The mating flanges of these two parts when welded together forms a U-shaped channel 21 located in the vicinity of the bottom corners of the back window. This channel 21 leads directly towards a mid point of each corner of the deck opening nearest the back window. This channel creates a natural funnel that, given the proper conditions, will force moisture into the carrier 14. To complicate matters further, the same flanges are bent towards vertical 75 degrees to form the retention flange 16. This creates additional variations in the surface contour for the weather strip to seal, all at a location already made difficult to seal by the natural funnel formed from welding the two body panels together 18 and 20.

In accordance with the present invention, the weatherstrip 10 includes an extruded weatherstrip wherein the foot 26 is of an uncured elastomeric material and the remaining seal member, i.e., bulb 12, carrier 14, base 22, grip fins 24, lower grip fin 27, cosmetic lip 28, is generally of a cured elastomeric material formed integral with the uncured foot. By omitting the curing agent from the material forming the foot 26 the material will never cure and achieve a stiffness property typically achieved of a cured weatherstrip. It is because the uncured material remains pliable that the material may "cold" flow or spread to voids and imperfections in the sheet metal to seal the voids and imperfections at the base of the retention flange 16. The "cold" flow of the uncured material is further facilitated and enhanced by the downward retentive force created by the cooperative action of the grip fins 24 or retention aid 25 and lower grip fin 27 to force the uncured material into the sheet metal imperfections.

As shown in the figures, the uncured foot 26 extends from the base or bottom of the first leg 21 of the U-shaped depending carrier 14. The base or bottom of the foot 26 is positioned against the sheet metal surface such that the foot may conform to surface imperfections within the sheet metal at the base of the retention flange 16. Preferably, for the weatherstrip 10 as shown, the uncured material forming the foot 26 is positioned at a location contiguous the sheet metal and adjacent the base of the retention flange 16 such that moisture and the like is blocked at the point where moisture will first attempt to enter the cavity formed by the U-shaped carrier 14. However, the size, position and shape of the uncured foot 26 may be varied as desired to provide a suitable contact surface area and weather resistant seal as necessary to spread to voids and imperfections in the sheet metal to seal the voids and imperfections.

The weatherstrip 10 may be made by extruding a continuous length of elastomeric material formed by the polymerization of ethylene propylene and diene monomers from one or more extruders through an appropriately configured die. The techniques for simultaneously extruding two different types or compositions of elastomeric material from a single extrusion die to form a single combined extruded product are well known in the art. Suitable metal reinforcement strips of a type well known in the art may also be coextruded within the weatherstrip as required and a curing agent of a type well known in the art may be selectively added to only that portion of the elastomeric material forming the weatherstrip which is to be cured. Typical curing agents well known in the art include heating in the presence of sulfur and/or organic peroxides. The rate of cure may be adjusted as desired by the use of organic accelerators. After the weatherstrip profile is formed and a portion of the weatherstrip appropriately cured the weatherstrip is cut to a desired length.

In accordance with one embodiment, after the weatherstrip 10 has been coextruded, the sealer material forming the retention aid 25 as previously described is injected under pressure through an appropriately configured nozzle positioned within the carrier 14 of the seal member. The sealer material forming the retention aid 25 adheres as a continuous bead to the side of the carrier 14.

The patents referred to herein are hereby incorporated by reference.

Having described presently preferred embodiments of the invention, it is to be understood that it may be otherwise embodied within the scope of the appended claims.

What is claimed is:

1. An extruded weatherstrip of an elastomeric material formed by polymerization of ethylene propylene and diene monomers capable of adapting to a surface contour of a retention flange, said weatherstrip comprising:

a foot of pliable uncured elastomeric material; and a seal member of cured elastomeric material formed integral with said foot, said seal member having a retention means to force said foot within imperfections and variations in the surface contour of the retention flange to provide a weather resistant seal with the retention flange.

2. The weatherstrip of claim 1 wherein said seal member includes a bulb and a depending carrier formed integral with said bulb, said bulb acting to seal against a movable surface which closes downward on a generally vertically extending retention flange.

3. The weatherstrip of claim 2 wherein said depending carrier is generally of an inverted U-shape including a first leg and a second leg spaced apart and interconnected by a base attached to said bulb.

4. The weatherstrip of claim 3 wherein said first leg and said second leg include a plurality of grip fins, said grip fins extending inwardly from each leg of said depending carrier to grip the retention flange and retain the weather strip on the retention flange to force said foot within imperfections and variations in the surface contour of the retention flange to provide a weather resistant seal with the retention flange.

5. The weatherstrip of claim 4 further comprising a cosmetic lip, said cosmetic lip extending from a side of said first leg of said depending carrier to cover a portion of the retention flange.

6. The weatherstrip of claim 3 wherein said first leg includes a retention aid extending inwardly from said first leg of said depending carrier to adhesively engage an outwardly facing surface of the retention flange.

7. The weatherstrip of claim 6 wherein said second leg of said depending carrier includes a lower grip fin which frictionally engages and grips a lower inwardly facing surface of the retention flange such that said retention aid and said lower grip fin cooperatively retain the weather strip on the retention flange and force said foot within imperfections and variations in the surface contour of the retention flange to provide a weather resistant seal with the retention flange.

8. The weatherstrip of claim 3 wherein said foot extends from said first leg of said depending carrier.

9. The weatherstrip of claim 8 wherein a base of said foot is positioned against imperfections and variations in the surface contour of the retention flange to provide a weather resistant seal with the retention flange.

10. An extruded weatherstrip of an elastomeric material formed by polymerization of ethylene propylene and diene monomers capable of adapting to a surface contour of a retention flange, said weatherstrip comprising:

a foot of pliable uncured elastomeric material; and a seal member including a bulb and a depending carrier of cured elastomeric material, said depending carrier of an inverted U-shape including a first leg and a second leg spaced apart and interconnected by a base attached to said bulb, said foot extending from said first leg of said depending carrier and said first leg and said second leg having a retention means to force said foot within imperfections and variations in the surface contour of the retention flange to provide a weather resistant seal.

11. The weatherstrip of claim 10 wherein said first leg and said second leg include a plurality of grip fins, said grip fins extending inwardly from each leg of said depending carrier to grip the retention flange and retain the weather strip on the retention flange to force said foot within imperfections and variations in the surface contour of the retention flange to provide a weather resistant seal.

12. The weatherstrip of claim 11 further comprising a cosmetic lip extending from a side of said first leg of said depending carrier.

13. The weatherstrip of claim 10 wherein said first leg includes a retention aid extending inwardly from said first leg of said depending carrier to adhesively engage the retention flange.

14. The weatherstrip of claim 13 wherein said second leg of said depending carrier includes a lower grip fin which frictionally engages and grips the retention flange such that said retention aid and said lower grip fin cooperatively retain the weather strip on the retention flange and force said foot within imperfections and variations in the surface contour of the retention flange to provide a weather resistant seal with the retention flange.

\* \* \* \* \*